Patented May 21, 1935

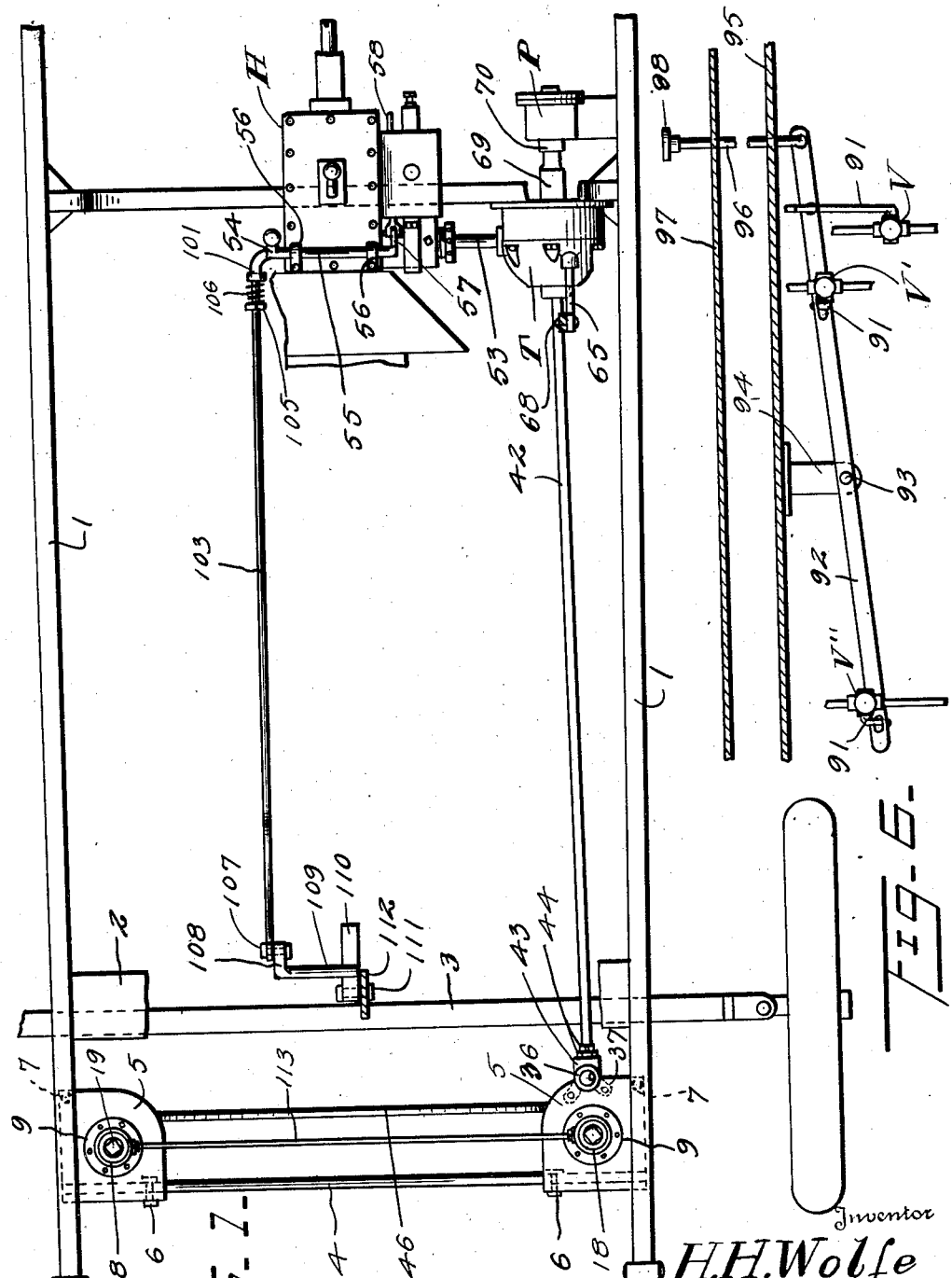

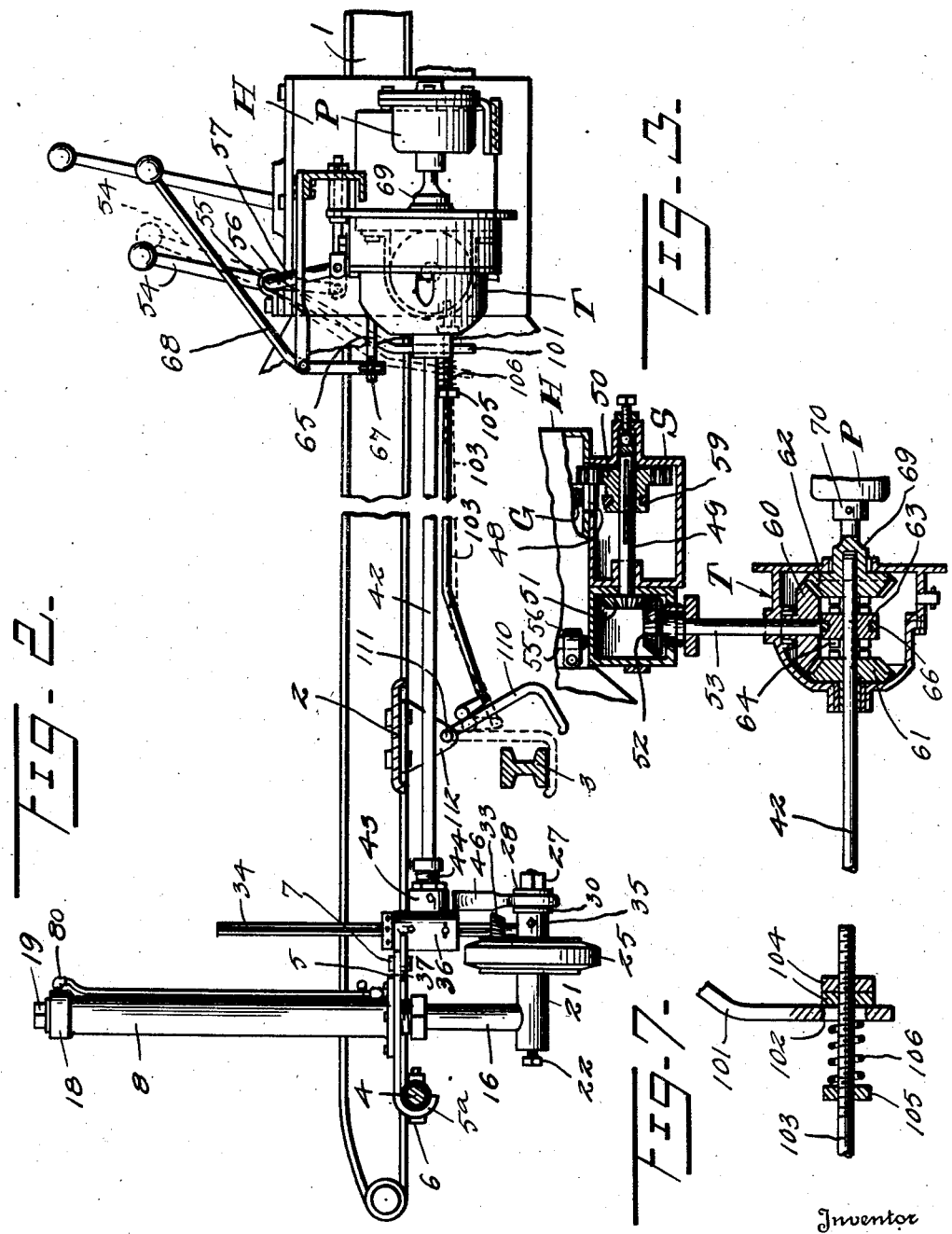

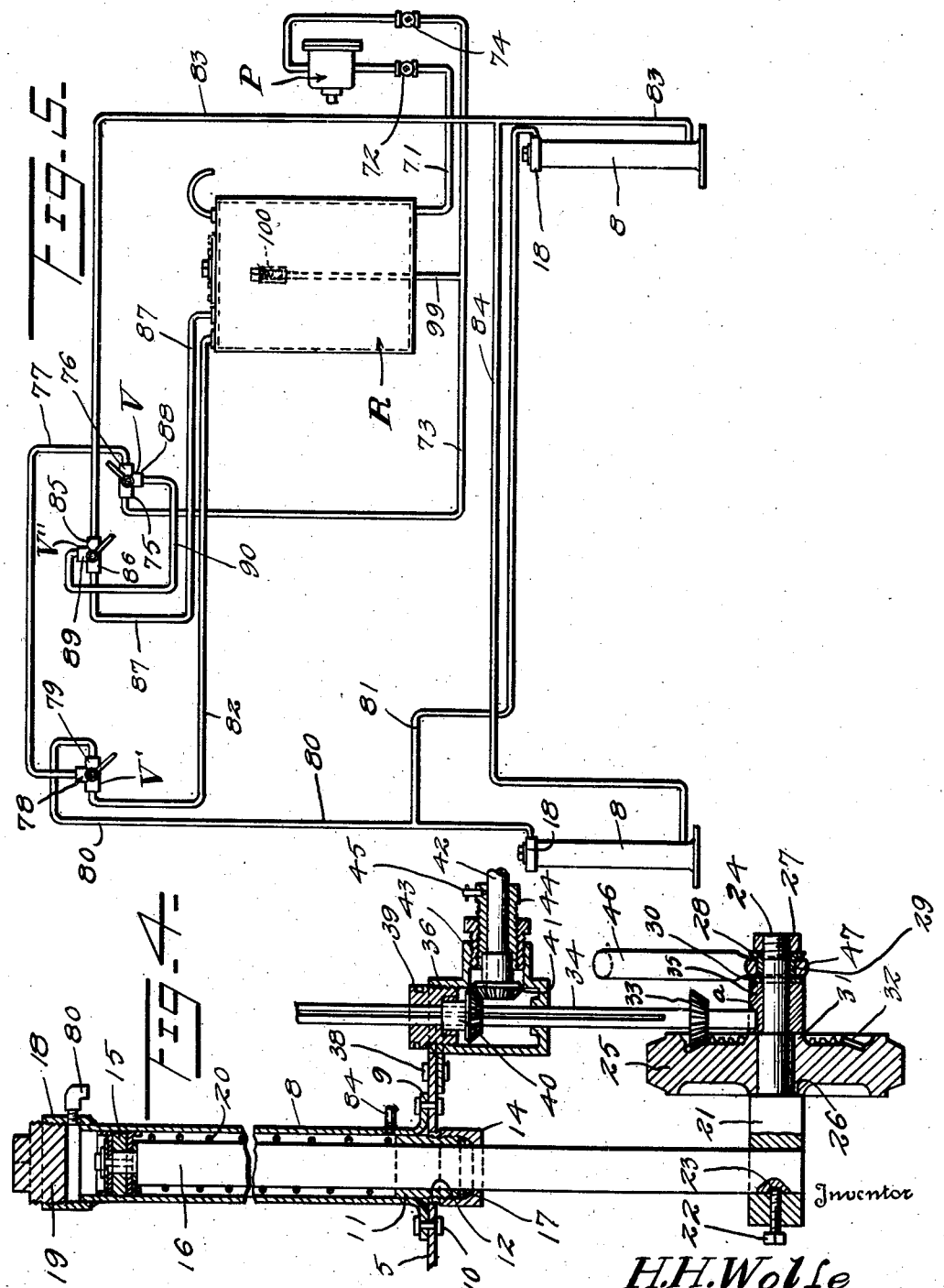

2,002,132

UNITED STATES PATENT OFFICE 2,002,132

PARKING OR DEPARKING MECHANISM

Homer H. Wolfe, Little Rock, Ark., assignor to Automobile Side-Drive Corporation, Little Rock, Ark., a corporation of Arkansas Application November 19, 1932, Serial No. 643,494

6 Claims. (Cl. 180—1)

This invention relates to a parking or deparking mechanism and has relation to a mechanism of this kind particularly designed and adapted for use in connection with motor driven vehicles, and it is primarily an object of the invention to provide means whereby a vehicle may be conveniently and quickly caused to enter or leave a restricted space along the curb of a roadway or other location whereby the desired parking or deparking of the vehicle is materially facilitated.

Another object of the invention is to provide a mechanism of this kind comprising a ground engaging member carried by the forward end portion of the vehicle which is adapted to be positively driven in a vertical path from the motor proper of the vehicle, the movement of said ground engaging member in one direction resulting in a jacking operation while the movement in the opposite direction results in a lowering of the forward end portion of the vehicle, said ground engaging member when the forward end portion of the vehicle is raised out of contact from the ground surface or roadway being operated to effect a lateral travel of the forward end portion of the vehicle selectively in either direction.

An additional object of the invention is to provide a mechanism of this kind wherein is embodied a ground engaging member adapted to be driven from the motor proper of the vehicle to cause an end portion of the vehicle to travel laterally in either direction under control of the driver together with a fluid means also under control of the motor proper of the vehicle to effect the desired jacking or raising up of the vehicle and its desired lowering.

A still further object of the invention is to provide a mechanism of this kind which in its construction is comparatively light and thereby adding no undue load to the vehicle to which the mechanism is applied.

An additional object of the invention is to provide a mechanism of this kind including a traction member with which is associated a fluid operating means for effecting the traction member for desired jacking of an end portion of the vehicle with a resultant lowering, said reverse operations being effected by retrograde flow of the fluid and wherein means are provided operable from the instrument board to effect the desired reverse flow of the fluid thus avoiding the necessity of the driver leaving his seat.

The invention also contemplates a mechanism of this kind which effectively operates without hindrance or obstruction to the driving mechanism proper for the vehicle and whereby no braking medium is required other than the standard equipment of the vehicle.

The invention consists in the details of construction and in the combination and arrangement of the several parts of my improved parking or deparking mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan and of a diagrammatic character of the forward end portion of the chassis of a motor driven vehicle illustrating features of my improved mechanism as herein embodied;

Figure 2 is a view partly in side elevation and partly in section of the mechanism as illustrated in Figure 1 certain of the parts being indicated by broken lines in second positions;

Figure 3 is a fragmentary view partly in top plan and partly in section illustrating the driving connection of the power shaft of the mechanism with the transmission of the motor proper;

Figure 4 is a view partly in elevation and partly in section of one of the traction members herein employed and the parts directly associated therewith;

Figure 5 is a diagrammatic view illustrating the system for effecting the desired action of the ground engaging members;

Figure 6 is a view partly in horizontal section and partly in top plan illustrating the means herein employed whereby is effected the desired control or regulation of the fluid for operating the ground engaging members;

Figure 7 is a fragmentary view partly in section and partly in elevation illustrating the operative connection between the clip operating rod and a rock arm.

As disclosed in the accompanying drawings, I denotes the forward end portions of the side members of the chassis of a motor driven vehicle. These members I are connected in a conventional manner by a cross member 7 which is positioned directly above the front axle 3. The side members I at a desired point in advance of the cross member 2 are also tied or connected as is well known by a cross rod 4.

Each end portion of the rod 4 has resting there-upon from above the forward marginal portion of a plate or table 5. The forward portion of this plate 5 is curved, as at 5ª, to conform to the periphery of the rod 4, and the inner extremity of this portion 5ª is bolted as at 6 or otherwise rigidly secured to the rod 4. The outer side marginal portion of the plate 5 overlies the lower flange of the adjacent side member 1 and the inner portion of said side margin is bolted, as at 7, or otherwise firmly secured to the member 1.

Each of the plates or tables 5 provides a mounting for an upstanding cylinder 8 of desired dimensions and which, as herein disclosed, is initially open at opposite ends.

The lower end portion of the cylinder 8 is defined by an outstanding encircling flange 9 which is bolted, as at 10, or otherwise fixed to the plate or table 5. This lower end portion of the cylinder 8 telescopically receives the upper end portion of a sleeve 11 welded or otherwise secured within the cylinder 8. The lower portion of this sleeve 11 is directed through a suitably positioned opening 12 in the plate or table 5, and threaded from below on the sleeve 11 is a packing nut 14.

Placed within the cylinder 8 is a double acting piston 15 of any ordinary or preferred construction and which is fixed to the inserted end portion of a rod 16. This rod 16 is of desired length and is snugly but slidably directed through the sleeve 11 and at all times extends below the plate or table 5. The nut 14, hereinbefore mentioned, serves to effectively hold in contact with the rod 16 suitable packing 17 whereby leakage of oil or other fluid within the cylinder 8 is prevented.

The upper end portion of the cylinder 8 as herein disclosed has welded or otherwise secured thereto the lower end portion of a surrounding collar 18. Threaded or otherwise engaged within this collar 18 is a closing plug 19. By means of the plug 19 the desired assembly of the cylinder 8 and the piston 15 and the parts directly associated therewith may be conveniently effected.

Encircling the portion of the rod 16 within the cylinder 8 and interposed between the piston 15 and the inserted end of the sleeve 11 is an expansible member 20, herein disclosed as a coil spring, which, as the piston 15 moves downwardly, is placed under tension for a purpose to be hereinafter explained.

The lower or extended end portion of the rod 16 as particularly illustrated in Figure 4 is directed through an end portion of a relatively heavy axle 21, said axle being held to the rod 16 by a holding screw 22 herein disclosed as threaded into the outer end portion of the axle 21 and engaged within a pocket or recess 23 in the rod 16.

This axle 21 is disposed rearwardly with respect to the chassis and substantially in parallelism with the longitudinal axis of such chassis and the free or rear end portion of the axle 21 is formed to provide a spindle 24 upon which is mounted for free rotation a ground engaging member or dolly wheel 25. This member or wheel 25 is of such dimensions as preferred and can be made as desired.

The spindle 24 results in a shoulder 26 against which the member or wheel 25 abuts and said member or wheel 25 is maintained in desired position upon the spindle 24 by a holding nut 27 threaded upon the outer end portion of the spindle 24.

As illustrated in Figure 4, this nut 27 is shown as having direct contact with a washer 28 abutting an end portion of a bushing 29 freely surrounding the spindle 24 with the inner end portion of the bushing in engagement with a second washer 30 having contact with the outer end of a bushing 35 on the spindle 24 immediately adjacent to the member or wheel 25.

I have only illustrated in detail one of the ground engaging members or dolly wheels 25 and associated structures as they are both substantially duplicate except that one of the members or wheels 25 as particularly illustrated in Figure 4 carries a bevel gear 32 concentric to its axis and, as illustrated in Figure 4, is shown as integrally formed with the member or wheel 25.

I do not, however, wish to be limited in this particular respect as of course the gear 32 may be provided or assembled in any manner which fully complies with the necessities of practice.

This gear 32 meshes with a bevel pinion 33 fixed to the lower end portion of a vertically disposed shaft 34 the lower end portion of which being received within a bearing recess a provided in the bushing 35 which is freely mounted upon spindle 24. This shaft 34 is of desired length and the upper end portion thereof is disposed through a boxing or housing 36 depending from the rear marginal portion of the plate 5. This boxing or housing 36, as herein disclosed, is provided with a plurality of laterally directed arms 37 welded or otherwise secured thereto and which underlie the adjacent marginal portion of the plate or table 5 and are bolted, as at 38, or otherwise secured to the plate or table 5. Initially the upper end of the boxing or housing 36 is open but is closed by a plug 39 threaded therein and through which the upper portion of the shaft 34 is freely directed. This plug 39 serves as a thrust bearing for a bevel gear 40 positioned within the boxing or housing 36 and keyed to the shaft 34 for rotation therewith but allowing said shaft 34 to have endwise movement therethrough. This gear 40 engages from above a bevel pinion 41 fixed to the end portion of a drive shaft 42. This end portion of the shaft 42 extends within the boxing or housing 36 through a laterally and rearwardly directed branch 43 and also through the bearing sleeve 44 suitably fixed within the branch 43.

The outer portion of the sleeve 44 carries a nipple 45 whereby a lubricating gun can be conveniently used.

The outer portions of the spindles 24 are connected by a transversely disposed brace rod 46 each end portion of which having an eye 47 through which the outer portion of a spindle 24 is directed. It is to be noted that the bushing 29 on such spindle 24 is of a length to extend slightly beyond the opposite faces of the eye 47 whereby each end portion of the rod 46 may have swivel movement about the spindle 24. It is also to be noted that this brace rod 46 is disposed on an upward curvature or arch so that it will offer no undue hindrance or obstruction to the normal travel of the vehicle to which my improved mechanism is applied. In other words, the curvature or arch of this rod 46 is such as to allow the same to readily pass over normal road obstructions.

Carried in a conventional manner by the chassis of the vehicle is the housing H for the conventional transmission which includes the reverse gear G which, as is well known, is continuously driven while the motor is in neutral. This gear G is positioned adjacent to an opening 48 in a wall of the housing H, said opening affording communication with a supplemental housing S. Within this supplemental housing S is mounted a shaft 49 on which is keyed for rotation therewith a gear 50, said gear however being free to move lengthwise of the shaft 49. This shaft 49 also carries a bevel gear 51 constantly in mesh with a second bevel gear 52 carried by an end portion of a shaft 53 which, as particularly illustrated in Figure 3, is substantially at right angles to the shaft 49.

When the gear 50 is in mesh with the gear G the shaft 53 is rotated and, as herein disclosed, the desired movement of the gear 50 to bring the same into or out of mesh with the gear G is accomplished by an upstanding hand lever 54 carried by an end portion of a shaft 55 supported, as at 56, upon the top of the transmission housing H for rocking movement. One end portion of this shaft 55 has a depending rock arm 57 operatively engaged with an end portion of a slide 58 disposed through the supplemental housing S. This slide 58 within the housing S carries a yoke 59 in operative engagement as is well known with the hub of the gear 50.

The shaft 53 hereinbefore referred to also extends within an auxiliary transmission casing T supported to one side of the housing H. Within the casing T the shaft 53 carries a bevel gear 60 interposed between the bevel gears 61 and 62 each freely mounted upon the end portion of the drive shaft 42 hereinbefore referred to extending within the casing T. Mounted upon the shaft 42 between the gears 61 and 62 and rotating with said shaft but free to move lengthwise thereof is a member 63, the opposite faces of which being provided with means for coaction with means upon the opposed faces of the gears 61 or 62 as indicated at 64 to allow the member 63 to have clutching engagement with either of said gears. However, it is to be particularly noted that when the member 63 is in clutching engagement with one of the gears it is entirely free of the other and that when this member 63 is in neutral position, as illustrated in Figure 3, it is free of both of said gears.

The required movement of the member 63 lengthwise of the shaft 42, as herein disclosed, is accomplished by proper endwise movement of the slide 65 extending within the casing T, the inserted end portion of the slide carrying a fork 66 in conventional engagement with the member 63. The outer end portion of the slide 65 is operatively engaged, as at 67, with a hand lever 68.

Upon throwing the lever 68 in one direction the member 63 will have clutching engagement with the gear 61 effecting a rotation of the shaft 42 in one direction, and by oppositely moving the lever 68 the member 63 will engage the gear 62 to rotate the shaft 42 in the opposite direction.

As illustrated in Figure 3, the gears 61 and 62 are constantly in mesh with the gear 60 and the gear 62 is provided with a hub 69 extending exteriorly of the casing T and is coupled in any conventional manner with the shaft 70 of a rotary pump P.

Suitably mounted upon the dash board of the vehicle body is a container R constituting a reservoir and which has leading from its bottom an oil line 71 which is in communication with the pump P hereinbefore referred to and which pump in practice is preferably positioned below the reservoir R. Interposed in this line 71 is a non-return valve 72 of any desired type. Leading from the pump P is a delivery line 73 in which is also interposed a non-return valve 74. This line or pipe 73 is in communication with the leg 75 of a three-way valve V.

Leading from the opposed leg 76 of the valve V is a line 77 in communication with the intermediate or stem leg 78 of a second three-way valve V'. Leading from one of the head legs 79 of the valve V' is a pipe line 80 which communicates with the upper portion of a cylinder 8 and preferably through the collar 18 thereof as illustrated in Figure 4 of the drawings. This pipe line 80 has leading therefrom a branch line 81 which affords communication with the upper portion of the second cylinder 8. The second head leg of the valve V' has leading therefrom a pipe line 82 which constitutes a return to the container or reservoir R, said line 82 being preferably in communication with the container or reservoir R through the top thereof.

In communication with the lower portion of one of the cylinders 8 is a pipe line 83 having a branch 84 in communication with the lower portion of the second cylinder 8. This pipe line 83 also communicates with a leg 85 of a third three-way valve V" and leading from the opposed leg 86 of this valve V" is a pipe line 87 in communication with the container or reservoir R and preferably through the top thereof, said line 87 also constituting a return.

Connecting the stem leg 88 of the valve V and the stem leg 89 of the valve V" is a pipe line 90. The three-way valves V, V' and V" are of a conventional type and each including a rotatable member operated by a stem 91. These stems 91 are all operatively engaged, as illustrated in Figure 6, with a rock lever 92 whereby the valves are properly adjusted in unison upon requisite manipulation of the lever 92.

As particularly illustrated in Figure 6, the lever 92 is pivotally mounted, as at 93, at a desired point intermediate its ends upon a bracket 94 extending from the engine side of the dash board 95 of the vehicle body and one end portion of the lever 92 has operatively engaged therewith a rod 96 which is slidably disposed through the dash board 95 and the conventional instrument board 97. This rod 96 terminates outwardly of the instrument board 97 and carries an operating head or button 98 to facilitate the desired push or pull of the rod 96 in accordance with the movement desired to be given to the lever 92.

With the lever 92 in the position illustrated in Figure 6, the valve V is open for flow through the legs 75 and 76 thereof while flow through the stem leg 78 is closed. The flow then continues through the line 77 to the valve V'. The valve V' is adjusted to allow flow through the stem leg 78 and the head leg 79 and through the pipe line 80 and the branch line 81 to the upper portions of the cylinders 8. With the lever 92 in the position shown in Figure 6 the valve V" is adjusted to allow direct flow through the legs 85 and 86. It is to be stated at this time that initially the container or reservoir R together with the various pipe lines are filled with oil or kindred fluid and with the lever 92 adjusted as illustrated in Figure 6 and the various three-way valves set as hereinbefore referred to, operation of the pump P will cause the fluid under pressure to enter the upper portions of the cylinders 8 and to force downwardly the piston 15 in each of the cylinders 8 until a ground engaging member or dolly wheel 25 is brought into contact with the ground surface whereupon the continued pressure of the fluid will result in the cylinder 8 and the adjacent forward end portion of the vehicle moving upwardly. The forward end portion of the vehicle will be maintained in raised position until the lever 92 has been operated to adjust the several valves to relieve the action of the fluid above the pistons 15.

The forward end portion of the vehicle is adapted to be lifted to properly free the front wheels of the vehicle from the ground surface. In the event, however, the action of the pump is not stopped before the vehicle has been fully raised the continued pressure of the fluid with the pipe lines will be released into the container or reservoir R through the relief line 99. The inserted end portion of this line 99 carries a relief valve 100 of any desired type or construction which is adapted to automatically open when the pressure within the line 99 reaches a predetermined degree.

As the pistons 15 within the cylinders 8 move downwardly or the cylinders 8 are moving upwardly the fluid within the system below the pistons 15 will freely pass through the lines 83 and 84 and through the legs 85 and 86 of the valve V" and the line 87 to the container or reservoir R. When it is desired to lower the forward end of the vehicle and to afterwards raise or elevate the ground engaging members or dolly wheels 25, the rod 96 is pushed inwardly substantially reversing the position of the lever 92 as illustrated in said Figure 6 with the result that the flow of the fluid under pressure created by the pump P will pass through the line 73 and through the legs 75 and 88 of the valve V. The fluid then continues through the line 90 to the leg 89 of the valve V" and through the leg 85 and the pipe line 83 and its branch 84 to the lower portions of the cylinders 8. At the same time the upper portions of the cylinders 8 through the lines 81 and 80 are opened through the legs 78 and 79 of the valve V' and through the pipe 82 to the reservoir or container R.

When under this operation the piston 15 has been raised to the limit of its upward movement under the action of the fluid the excess pressure will be taken care of by the relief valve 100 hereinbefore referred to. This is of especial importance and advantage because it allows the pump P to operate during the time the forward end of the vehicle is being vertically moved or caused to travel laterally. By having a continuous operation of the pump P it is assured that maximum of hydraulic pressure will be maintained in the cylinders 8 which is of especial importance should there be leakage anywhere in the system.

In either of the operations of the mechanism, that is to say, upon the jacking action or the lowering action, the upper portion of the shaft 34 provides an effective medium whereby the occupant of the vehicle may approximately determine the exact location of the ground engaging members or dolly wheels 25. This is due to the fact that this shaft 34 is so located as to be readily observed by the driver while at the wheel.

After the lever 92 has been adjusted to set the three-way valves V, V' and V" to allow for the jacking of the forward end portion of the vehicle and with the vehicle of course in proper placement with the motor idle and with the brakes in release, the lever 54 is thrown by the driver to bring the gear 50 into mesh with the reverse gear G resulting in rotation of the shaft 53. Then in accordance with the desired direction of lateral movement of the forward end portion of the vehicle the lever 68 is thrown resulting in rotation of the shaft 42 in the direction to effect the desired rotation of the ground engaging member or dolly wheel 25 with which the shaft 34 is operatively engaged. The lever 68, however, is not thrown until after the forward end portion of the vehicle has been jacked but just as soon as the shaft 53 is brought into action the pump P becomes effective through the gears 60 and 62. In other words, the lever 68 is not brought into action until after the forward end portion of the vehicle has been sufficiently raised from the ground.

The shaft 55 is provided with a second depending rock arm 101 provided in its lower portion with an opening 102 through which is freely directed an end portion of a rod 103. Engaged with the rod 103 rearwardly of the rock arm 101 are the retaining nuts 104. The rod 103 in advance of the rock arm 101 is provided with an adjustable stop or nut 105 and interposed between this stop or nut 105 and the free end portion of the rock arm 101 is a coil spring 106. The forward end portion of the rod 103 is pivotally connected, as at 107, with a depending angular end portion 108 of a rod 109 extending laterally from a substantially L-shaped holding clip 110. The rod 109 is provided in order to obtain the desired connection between the clip 110 and the rock arm 101 of the shaft 55.

When the gear 50 is in its neutral position as illustrated in Figure 3, the clip 110 is in raised or inoperative position. However, when the lever 54 is pulled to bring the gear 50 into operative engagement with the reverse gear G, the resultant swinging movement of the rock arm 101 pushes the rod 103 forwardly with the result that the clip 110 is engaged below the axle 3 and thereby effectively holding the vehicle springs at the forward end of the chassis from expanding as the weight of the vehicle is taken off of the front wheels as the forward portion of the vehicle is elevated. This clip 110 is maintained in its working engagement with the axle 3 as indicated by broken lines in Figure 2 until the lever 54 is thrown to release the gear 50 from the reverse gear G.

This clip 110 is pivotally connected, as at 111, to a bracket 112 depending from the cross member 2.

It is believed to be clearly apparent from the foregoing that my improved mechanism coacts only with the front end portion of the vehicle and it is, therefore, to be stated that in operation when it is desired to park a vehicle within a limited space the vehicle is so manipulated as to back the rear portion within said limited space on an angle whereupon the ground engaging members or dolly wheels 25 are brought into action as hereinbefore referred to. The lateral movement of the vehicle as effected by these ground engaging members or dolly wheels 25 is such that the rear wheels of the vehicle serve substantially as a fulcrum which is of course materially facilitated when the brakes are in release. However, if during this operation the vehicle should be disposed on a steep incline it is important that the emergency brake be brought into action.

While I have hereinbefore particularly stated that my improved mechanism is intended to facilitate parking or deparking of a vehicle it is believed to be obvious that it can be employed with equal advantage to effect a turntable action to enable a vehicle to be turned about within a restricted area.

It is also believed to be obvious that my improved mechanism provides means whereby the forward end portion of the vehicle may be readily and conveniently jacked up for the purposes of inspection and repair or to meet other conditions which may arise as in case of a flat tire.

It is also to be stated that the brace rod 46 serves to maintain the spindles 24 substantially in parallelism and the yoke or rod 46 possesses sufficient inherent resiliency to allow the same to yield in the event the contact of the ground engaging members or dolly wheels 25 should be irregular.

I also find it of advantage to tie or connect the upper end portions of the cylinders 8 with an intermediate brace rod 113 as particularly illustrated in Figure 1.

The springs 20 hereinbefore referred to serve as an emergency support to maintain the rods 16 together with their members or wheels 25 in raised position and particularly in the event a leakage should occur in any of the pressure lines associated with the cylinders 8. It is also believed to be apparent that these springs operate to facilitate the desired raising or lifting of the rods 16 and the ground engaging members or dolly wheels 25.

From the foregoing description it is thought to be obvious that a parking or departing mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with the chassis and front axle of a vehicle, a jacking member carried by the forward portion of the vehicle including a ground engaging dolly wheel, a drive member, driven means operatively engaged with the dolly wheel, means including a manually operated rock lever for connecting or disconnecting the drive member and the driven means, a rock arm carried by the lever, a holding clip pivotally supported by the chassis at a point above the front axle, said clip when in one position engaging beneath the axle to hold the chassis and axle against separating movement, an elongated rod in operative connection between an end portion of the rod and the clip, the opposite end portion of the rod being freely disposed through the rock arm of the lever, retaining members carried by the rod at opposite sides of the rock arm, a coil spring surrounding said rod and interposed between the rock arm and the retaining member on the rod in advance of said rock arm, the operation of the rock arm through the rod making the clip effective when the drive member and driven means are connected and to make said clip ineffective when the drive member and the driven means are disconnected.

2. In combination with the chassis and front axle of a vehicle, a jacking member carried by the forward portion of the vehicle including a ground engaging dolly wheel, a drive member, driven means operatively engaged with the dolly wheel, means including a manually operated rock lever for connecting or disconnecting the drive member and the driven means, a rock arm carried by the lever, a holding clip pivotally supported by the chassis at a point above the front axle, said clip when in one position engaging beneath the axle to hold the chassis and axle against separating movement, an elongated rod in operative connection between an end portion of the rod and the clip, the opposite end portion of the rod being freely disposed through the rock arm of the lever, retaining members carried by the rod at opposite sides of the rock arm, a coil spring surrounding said rod and interposed between the rock arm and the retaining member on the rod in advance of said rock arm, the operation of the rock arm through the rod making the clip effective when the drive member and driven means are connected and to make said clip ineffective when the drive member and the driven means are disconnected, the operative connection between the rod and the holding clip comprising a laterally directed member extending from the clip, and means for pivotally connecting the rod to said laterally directed member.

3. In combination with the chassis of a motor driven vehicle, upstanding cylinders carried by the forward portion of the chassis and spaced transversely thereof, pistons working in the cylinders, rods connected to the pistons and extending below the cylinders, dolly wheels carried by the lower portions of the rods, a closed system of fluid circulation in communication with each of the cylinders at points above and below the piston therein and including a reservoir, a pump interposed in said system, means for continuously operating the pump during the vertical and lateral movements of the vehicle to maintain maximum hydraulic pressure in the cylinders, a relief valve within the reservoir and in communication with the closed system, a series of valves in the system to cause the fluid to enter the cylinders from above and to leave the cylinders from below and vice versa, means for operating the valves in unison, and a driving connection with one of the dolly wheels.

4. In combination with the chassis of a motor driven vehicle, upstanding cylinders carried by the forward portion of the chassis, a member operatively connected with all of the valves for operating the same in unison, and spaced transversely thereof, pistons working in the cylinders, rods connected to the pistons and extending below the cylinders, dolly wheels carried by the lower portions of the rods, a closed system of fluid circulation in communication with each of the cylinders at points above and below the piston therein and including a reservoir, a pump interposed in said system, means for continuously operating the pump during the vertical and lateral movements of the vehicle to maintain maximum hydraulic pressure in the cylinders, a relief valve within the reservoir and in communication with the closed system, a series of valves in the system to cause the fluid to enter the cylinders from above and to leave the cylinders from below and vice versa, and a driving connection with one of the dolly wheels, the means for operating the pump also operating the driving means for the dolly wheel.

5. In combination with the chassis and front axle of a vehicle, a jacking member carried by the forward portion of the vehicle including a ground engaging dolly wheel, a drive member, driven means operatively engaged with the dolly wheel, means including a manually operated rock lever for connecting or disconnecting the drive member and the driven means, a rock arm carried by the lever, a member movably supported by the chassis at a point above the front axle, said member when in one position engaging the axle to hold the chassis and axle against separating movement, an elongated rod in operative connection at one end portion with the movable member, the opposite end portion of the rod being freely disposed through the rock arm of the lever, a coil spring surrounding the rod in advance of the rock arm, the operation of the rock arm through the rod making the movable member effective when the drive member and driven means are connected and to make such movable member ineffective when the drive member and driven means are disconnected.

6. In combination with the chassis and an axle of a vehicle, a jacking member carried by the forward portion of the vehicle including a front engaging dolly wheel, a drive member, driven means operatively engaged with the dolly wheel, a manually operated lever for connecting or disconnecting the drive member and the driven means, a rock arm carried by the lever, a member movably supported by the chassis above the axle, said member when in one position engaging the axle to hold the chassis and axle against separating movement, and an elongated rod operatively connecting the movable member and the rock arm of the lever, the operation of the rock arm through the rod making the movable member effective when the drive member and driven means are connected and to make such movable member ineffective when the drive member and driven means are disconnected.

HOMER H. WOLFE.